United States Patent Office 3,453,284
Patented July 1, 1969

3,453,284
CERTAIN 2-(SUBSTITUTED-ANILINO)-2-OXAZOLINES
John Harvey, Jr., Wilmington, Del., assignor to E. I. du Pont de Nemours and Company, Wilmington, Del., a corporation of Delaware
No Drawing. Original application Feb. 28, 1964, Ser. No. 348,290. Divided and this application Jan. 19, 1966, Ser. No. 521,746
Int. Cl. C07d 85/36; A61k 27/00
U.S. Cl. 260—307    1 Claim This application is a divisional of United States application Ser. No. 348,290, filed Feb. 28, 1964.

This invention relates to the treatment of acute or chronic disorders of the central nervous and the cardiovascular systems and in particular to the use of a class of substituted 2-anilino-2-oxazolines for such treatment.

According to the present invention, a class of substituted 2-anilino-2-oxazolines has valuable pharmacological properties including anti-hypertensive and central nervous system depressant activity. The compounds are useful in both veterinary and human applications. They are characterized by particularly favorable therapeutic ratios.

The disclosure herein should not be taken as a recommendation to use the disclosed invention in any way without full compliance with U.S. Food and Drug laws and other laws and governmental regulations which may be applicable.

The compounds within the scope of the present invention are substituted 2-anilino-2-oxazolines having the formula (1)
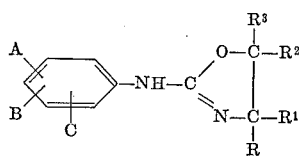

where the substituents R, $R^1$, $R^2$, $R^3$ can each be an alkyl group of 1 through 4 carbon atoms or preferably hydrogen with the total number of carbon atoms in these 4 substituents being a maximum of 8; A can be hydrogen, alkyl of 1 through 4 carbons and preferably 1 or 2 carbons, alkoxy of 1 through 4 carbons, and preferably 1 or 2 carbons, or halogen including chlorine, bromine and fluorine; B can be alkyl of 1 through 4 carbons and preferably 1 or 2 carbons, alkoxy of 1 through 4 carbons and preferably 1 or 2 carbons, or halogen including chlorine, bromine and fluorine; and C can be hydrogen, alkyl of 1 through 4 carbons and preferably 1 or 2 carbons, alkoxy of 1 through 4 carbons and preferably 1 or 2 carbons, halogen including chlorine, bromine and fluorine, alkylthio of 1 through 4 carbons and preferably 1 or 2 carbons, alkoxyalkyl wherein the alkoxy portion has 1 or 2 carbons and the alkyl portion has 1 or 2 carbons, alkylamino of 1 or 2 carbons, dialkylamino where the alkyl groups can be the same or different and each has 1 or 2 carbons, trifluoromethyl or trifluoromethoxy.

Particular advantages are obtained where the phenyl ring has at least one alkyl group.

In a preferred aspect, I have discovered within the above scope a narrow group of compounds which are characterized by outstanding activity in standard animal tests for evaluating central nervous system depressant activity. These compounds are novel and surprisingly have activity as high as 50 to 100 times that of known compounds which are closely related structurally to my novel compounds.

The novel compounds of this invention have the formula (2)
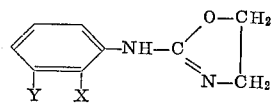

where X is methyl or ethyl and Y is methyl, ethyl or chloro. Particularly preferred compounds include 2-(2-methylanilino)-2-oxazoline
2-(2-ethylanilino)-2-oxazoline
2-(2,3-dimethylanilino)-2-oxazoline
2-(3-chloro-2-methylanilino)-2-oxazoline The compounds of this invention are generally crystalline solids. They can be readily prepared by reaction between an appropriately substituted aniline and an appropriate alkyl isocyanate to form the corresponding N-(substituted phenyl)-N'-(beta-substituted ethyl) urea, followed by heating in a suitable solvent to close the oxazoline ring. Alternatively, the urea can be prepared by reaction between an appropriately substituted phenyl isocyanate and an appropriate alkylamine, followed by ring closure.

In the foregoing procedures, the reaction between the amine and isocyanate can conveniently be carried out in a suitable inert organic solvent including both aromatic and aliphatic hydrocarbon solvents. Halogenated, oxygenated or nitrated hydrocarbon solvents are useful. Representative solvents are benzene, chloroform, carbon tetrachloride, ethylene dichloride, chlorobenzene, toluene, xylene, nitrobenzene and nitrotoluene. Temperatures in the range from 0° to 110° C. are suitable.

Formation of the anilinooxazoline is conveniently carried out by refluxing the urea in solution in a suitable solvent such as methanol, ethanol, propanol, butanol or preferably water, with elimination of hydrogen bromide, hydrogen chloride, hydrogen iodide, methanesulfonic acid, p-toluenesulfonic acid, or the like. Since the oxazolines are basic in nature, the liberated acid adds to the oxazoline to form an acid addition salt. The free base is liberated from the salt using an alkaline reagent such as ammonium hydroxide, sodium hydroxide, sodium bicarbonate, calcium oxide, or the like.

Useful synthesis techniques are described in Chem. Reviews, vol. 44, pages 463–466 (1949).

With reference to the oxazolines of this invention, it is specifically intended to include within the purview of the invention, the acid addition salts which these compounds form with acids having pharmaceutically acceptable anions. The term, "pharmaceutically acceptable anion" has a definite meaning to one skilled in the art. It is defined as a nontoxic anion of any of the simple acids commercially used to neutralize basic medicinal agents. These acids include, for example, hydrochloric, hydrobromic, hydroiodic, sulfuric, succinic, maleic, tartaric, citric, glycolic and others. The pharmaceutical activity of the molecule is primarily a function of the cation, the anion serving chiefly to supply electric neutrality.

By reference to the reaction described above, it can be seen that in the ordinary practice of the process of the invention, the oxazolines produced will be hydrobromides, hydrochlorides, hydroiodides, methanesulfonic acids or p-toluenesulfonic acids. These acids can be converted to other pharmaceutically acceptable acids by procedures well known to those skilled in the art. One highly useful method comprises contacting the acid addition salt with a basic anion exchange resin, for example, a highly basic compound such as the one available from Rohm & Haas Company under the name "Amberlite IRA–400." This resin is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt prepared as described above and a further anion exchange takes place converting the acid addition salt to the citrate and leaving the anion of the original salt on the resin. The citrate salt can be recovered from the eluate by a number of methods such as evaporation or solvent precipitation. This same procedure can be used to prepare nitrates, sulfates, acetates, and other acid addition salts.

In the practice of this invention, the active pharmaceutical agents may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base as peanut or sesame oil.

The pharmaceutical agents within the scope of this invention will generally be administered in the range of 0.5 to 500 milligrams per day and preferably 2 to 200 milligrams per day. However, in general, the physician or veterinarian will, of course, determine the dosage which will be most suitable for a particular application, and as might be expected, it will vary with the age, weight and general health of the patient under treatment and with various other factors which will be determined by the physician or veterinarian in attendance. When they are administered orally a larger quantity will be required to produce the same effect as a smaller quantity given parenterally. Parenteral administration of from 0.1 mg. to 250 mg. of active agent should be suitable to obtain some effect. Administration can also be by vapor or spray through the mouth or nasal passages.

The compositions of this invention may take a variety of forms. Various diluents may be employed and the percentage of active ingredients may be varied. It is necessary that an active ingredient form a proportion of the composition such that a suitable dosage form will be obtained. Obviously several dosage unit forms may be administered at about the same time. Although compositions with less than 0.005% by weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice-versa.

The following examples are given solely for the purpose of illustration and are not to be construed as limitations of this invention, many variations of which are possible without departure from the spirit or scope thereof.

Example 1

To a solution of 21.4 parts by weight of 2-methylaniline in 200 parts by weight of benzene is added dropwise at 30–40° C. a solution of 21.1 parts by weight of 2-chloroethyl isocyanate in 100 parts by weight of benzene. A white crystalline precipitate appears. After the addition is complete, the mixture is stirred for two hours at 25° C. temperature. The solids are collected on a filter, washed with pentane and dried. The product is N-(2-methylphenyl)-N'-(beta-chloroethyl) urea, M.P. 143–144° C.

To 1800 parts by weight of boiling water is added 40 parts by weight of N-(2-methylphenyl)-N'-(beta-chloroethyl) urea. The mixture is heated under reflux for 60 minutes after which the nearly clear solution is cooled on an ice bath to room temperature. A small quantity of insoluble material is removed by filtration. The pH of the solution is adjusted to pH 10 by the addition of concentrated ammonium hydroxide whereupon a precipitate forms. The precipitate is extracted with three 1,000 parts by weight portions of chloroform and the combined extracts washed with water. The organic layer is dried over anhydrous sodium sulfate and evaporated in vacuo. The crystalline residue which forms is triturated with ether, collected on a filter and dried. The product, which can be recrystallized from cyclohexane, is 2-(ortho-toluidino)-2-oxazoline, M.P. 87–89° C.

Example 2

Following the procedure of Example 1, 2,3-dimethylaniline and 2-chloroethyl isocyanate are used to prepare N-(2,3-dimethylphenyl)-N'-(beta-chloroethyl) urea, M.P. 143–144° C., which in turn is converted to 2-(2,3-dimethylanilino)-2-oxazoline, M.P. 105–109° C., recrystallizable from chlorothene.

Example 3

Following the procedure of Example 1, 3-chloro-2-methylaniline and 2-bromoethyl isocyanate are used to prepare N - (3-chloro-2-methylphenyl)-N'-beta-bromoethyl) urea, M.P. 158–159° C., which in turn is converted to 2-(3-chloro-2-methylanilino)-2-oxazoline, M.P. 135–136° C., recrystallizable from isopropyl alcohol.

Example 4

Following the procedure of Example 1, 2-ethylaniline and 2-bromoethyl isocyanate are used to prepare N-(2-ethylphenyl) - N' - (beta - bromoethyl) urea, M.P. 109–114° C., which in turn is converted to 2-(2-ethylanilino)-2-oxazoline, M.P. 62–66° C., recrystallizable from isopropyl alcohol.

Example 5

Following the procedure of Example 1, 3,4-dimethylaniline and 2-bromoethyl isocyanate are used to prepare N - (3,4 - dimethylphenyl) - N' - (beta - bromoethyl) urea, M.P. 124–130° C., which in turn is converted to 2-(3,4-dimethylanilino)-2-oxazoline, M.P. 161–164° C., recrystallizable from ethyl acetate.

Following the procedure described above, the following exemplary compounds within the scope of this invention can be prepared.

Ex.          Product:
6. 2-(3-isopropylanilino)-2-oxazoline.
7. 2-(2,3,4-trichloroanilino)-2-oxazoline.
8. 2-(4-methoxy-2-methylanilino)-2-oxazoline.
9. 5-methyl-2-(2,3-dimethylanilino)-2-oxazoline.
10. 4 - ethyl - 2 - (2,3 - dimethylanilino) - 2-oxazoline.
11. 4,4 - dimethyl - 2 - (2 - methyl - 3 - chloroanilino)-2-oxazoline.
12. 5-butyl-2-(2-methylanilino)-2-oxazoline.
13. 2-(2-dimethylaminoanilino)-2-oxazoline.
14. 2-(3-methylthionanilino)-2-oxazoline.
15. 2-(trifluoromethylanilino)-2-oxazoline.
16. 2 - (2 - trifluoromethoxy - 3 - methylanilino)-2-oxazoline.
17. 2-(2,4,5-trimethylanilino)-2-oxazoline.
18. 4 - methyl - 2 - (2 - methyl - 5 - isopropylanilino)-2-oxazoline.
19. 2-(2,5-dimethoxyanilino)-2-oxazoline.
20. 5-methyl - 2 - (2,4 - dimethoxy - 5 - chloroanilino)-2-oxazoline.
21. 2-(2-fluoroanilino)-2-oxazoline.
22. 2-(2 - bromo - 4 - methylanilino)-2-oxazoline.
23. 2-(2,5-diethoxyanilino)-2-oxazoline.
24. 2-(3 - chloro - 4 - methylanilino) - 2-oxazoline.
25. 2-(2,6-diethylanilino)-2-oxazoline.
26. 2-(4 - chloro - 2 - trifluoromethylanilino)-2-oxazoline.
27. 2-(3-chloro-4-fluoroanilino)-2-oxazoline.
28. 2-(4-fluoro-2-methylanilino)-2-oxazoline.

Pharmaceutical formulations can be prepared using any one or more of the compounds or pharmaceutically acceptable salts thereof within the scope of the present invention, with or without other pharmaceutically active substances, in accordance with the following examples which are given for purposes of illustration only and are not intended to be limiting.

Example A

A large number of unit capsules are prepared for oral administration by mixing the following ingredients:

| | Parts by weight |
|---|---|
| 2-(2,3-dimethylanilino)-2-oxazoline | 2,000 |
| Lactose, U.S.P. | 7,950 |
| Dry pyrogenic silica $SiO_2$ with particle size of 0.015 microns, surface area of 200 m.²/gm. and bulk density of 2.2 lbs./cu. ft. ("Cabosil," Cabot Corp.) | 50 |

After mixing, the mixture is screened through a 40 mesh screen and encapsulated in No. 3 two-piece hard gelatin capsules.

Example B

The active ingredient of Example A (20 parts by weight) is dispersed in 100 parts by volume of corn oil and encapsulated in standard soft gelatin capsules.

Example C

Tablets for oral administration are prepared by mixing 50 milligrams of the active ingredient of Example A, 2.5 milligrams of gelatin, 2.5 milligrams of magnesium stearate and 100 milligrams of starch, and forming the mixture into tablets by a conventional tableting machine. Slow release pills and tablets can also be used.

Example D

A parenteral composition suitable for administration by injetcion is prepared by dissolving 5% by weight of the active ingredient of Example A in 95% by volume of physiological saline and sterilizing the resultant solution by filtration. A buffer can be used if desired.

As mentioned above, the above Examples A through D can be repeated by substituting other compounds within the scope of this invention for the oxazolines of these examples.

The above and similar examples can be carried out in accordance with the teachings of this invention, as will be readily understood by persons skilled in the art, by substitution of components and amounts in place of those specified.

The foregoing detailed description has been given for clearness of understanding only and not unnecessary limitations are to be understood therefrom.

The invention claimed is:
1. 2-(2,3-dimethylanilino)-2-oxazoline.

References Cited

UNITED STATES PATENTS 2,714,082    7/1955    Davies et al. _____ 260—307 XR

FOREIGN PATENTS 245,816    1/1960    Australia.
1,340,810    9/1963    France.

ALTON D. ROLLINS, Primary Examiner.

U.S. Cl. X.R.

260—453, 575, 577, 578; 424—14, 272